United States Patent Office
3,819,598
Patented June 25, 1974

3,819,598
CATALYST COMPOSITION FOR THE
POLYMERIZATION OF OLEFINS
Francis R. Galiano, Overland Park, and Gene E. Kellum, Shawnee, Kans., Terry R. King, Orange, Tex., and David Rankin, Kansas City, Kans., assignors to Gulf Research & Development Company, Pittsburgh, Pa.
No Drawing. Filed Dec. 6, 1971, Ser. No. 205,371
Int. Cl. C08f 1/66, 3/06
U.S. Cl. 260—94.9 D                        4 Claims

ABSTRACT OF THE DISCLOSURE

An improved catalyst composition for the polymerization of mono 1-olefins comprising chromium oxide supported on a precipitated, porous silica having a surface area of not less than 150 square meters per gram and wherein the average diameter of the silica particles is less than 0.0005 millimeter.

BACKGROUND OF THE INVENTION

Conventionally, mono 1-olefins are polymerized by contacting the monomer with a catalyst which is an oxygenated chromium compound in combination with at least one oxide selected from the group consisting of silica, aluminum, zirconia and thoria, at least part of the chromium being in the hexavalent state when initiating the polymerization reaction. As the oxygenated chromium compound, it is known to use chromium oxide or a compound capable of being decomposed into chromium oxide by calcination of a stable chromate such as a chromate of an alkali metal.

The oxygenated chromium compound is normally associated with a support comprising an oxide selected from the group consisting of silica, aluminum, zirconia and thoria. The silicas employed in preparing the chromium oxide supported catalyst are conventionally gel-type silicas comprising hard granular aggregates. The silica particles are very porous with a large percentage of their surface area being internal.

When the above-described catalysts are employed in the solution polymerization of ethylene, linear polyethylene resins are produced which have undesirable surface defects when employed in injection molding fabrication processes. These surface defects appear to be associated with the catalyst particles which are not normally removed after polymerization. In order to minimize the effect of these hard granular silica xerogels, active catalyst compositions should be employed which leave only very fine particles in the finished polymers. Catalyst particles of such small size, however, present difficulties in all prepolymerization operations such as transport and activation, mainly because of extremely low bulk density.

Accordingly, an object of this invention is to provide an improved mono 1-olefin polymerization catalyst composition which is easily handled and leaves only very fine particles in the finished polymers.

Yet another object of the invention is to provide linear polyethylene resins having substantially improved surface characteristics when produced by solution polymerization processes.

Other objects, advantages and features of this invention will be readily apparent to those skilled in the art from the following description and appended claims.

SUMMARY OF THE INVENTION

By the invention there is provided an improved catalyst composition for the polymerization of mono 1-olefins comprising chromium oxide supported on a precipitated, porous silica having a surface area of not less than 150 square meters per gram and wherein the average dameter of the silica particles is less than 0.0005 millimeter.

DESCRIPTION OF THE INVENTION

As heretofore noted, the use of catalyst compositions comprising oxygen-containing chromium compounds for the polymerization of mono 1-olefins is well known. Such catalytic compositions are usually prepared by the impregnation of a carrier material such as silica with an aqueous solution of a chromium compound, which is at least partially present as a hexavalent chromium oxide on heating in the presence of molecular oxygen, drying of the product, and subsequently activating by heating in a stream of air or oxygen.

The polymerization of mono 1-olefins utilizing these catalyst compositions can be conducted in the presence or absence of a liquid phase. In the presence of a liquid phase, the polymer formed may be either dissolved or suspended in the reaction medium. Those processes wherein the polymer is dissolved are referred to as solution processes and those processes wherein the formed polymer is suspended are conventionally referred to as particle-form processes.

The nature of the silica support material exerts a significant influence on the characteristics of the product polymer. In particular, it has been discovered that the surface characteristics of the product polymers are substantially improved when employing catalyst compositions of very fine particle size. It has further been discovered that polymer products having substantially improved surface characteristics and a narrow molecular weight distribution can be obtained by employing a porous, precipitated silica having a surface area of at least 150 square meters per gram with a significant number of the silica pores having a diameter in excess of 300 Angstroms.

The silica support material employed in preparing the catalyst compositions of this invention is a friable, amorphous precipitated silica product which may be purchased or made, for example, by precipitation from sodium silicate by a process such as described in U.S. Pat. No. 3,208,823, incorporated herein by reference thereto. By the process described therein, hydrated, precipitated, finely divided silica particles substantially free of silica gel are obtained. The porous, precipitated silicas as, for example, those prepared by the process of the aforementioned patent differ from silica gels in that the ultimate particles cling together in a soft agglomerate structure which easily subdivides subsequent to entrance of the catalyst composition into the polymerization reactor. Although the ultimate particle size of the porous, precipitated silica is less than 0.0005 millimeter, agglomerates of these fine particles having an actual particle size in the range of 50 to 100 microns are normally employed in preparing and activating the catalyst compositions prior to introduction of the compositions into the polymerization reactor.

The precipitated, porous silicas employed in preparing the catalyst compositions of this invention have surface areas of at least 150 square meters per gram as determined by the BET test method set forth by S. Brunauer, P. H. Emmett and E. Teller in the Journal of American Chemical Society, vol. 60, p. 309, 1938. A substantial portion of the surface area of the silica particles is internal, as opposed to the surface areas of nonporous precipitated silicas which are substantially external, resulting in catalyst of low activity.

The porosity of the silica particles is a principal factor contributing to the friability of the silica. A significant number of the pores in the porous, precipitated silica employed in preparing the catalyst compositions of this invention are large pores. As employed herein, the term "large pores" refers to those pores having a diameter in excess of 300 Angstroms. The contribution that this macroporosity has in the production of the ultimate small catalyst particles in the polymerization reactor can be demonstrated by employing a mercury porosimetry test such as described in Aminco Laboratory News, vol. 24, No. 3, 1968. The mercury intrusion data obtained employing the named test shows a substantially greater volume change on compression during the intrusion experiment than can be obtained when testing nonporous, precipitated silica, for example. This friability of the porous, precipitated silica is significant in that the silica particles are broken up to form much finer particles during the polymerization reaction by forces developed during the growth of polymer molecules on the catalyst active site. The resulting catalyst particles being less than 0.0005 millimeter in diameter, are innocuous in the final resin product and do not produce the heretofore noted surface imperfections in moldings prepared from the olefin monomers.

The catalyst compositions of this invention can be prepared by preparation methods known in the art, e.g., dry mixing of solid components, impregnation, and the like. In order to obtain optimum activity, it is preferred that the catalyst compositions comprising chromium oxide and silica as hereinbefore specified be heated under elevated temperatures and for a sufficient time to activate, or increase the activity of, the catalyst composition for the polymerization reaction. It is also preferred that the catalyst composition be heated under oxidizing conditions in an atmosphere such as oxygen, air, or oxygen mixed with nitrogen, carbon dioxide, helium, argon, krypton or xenon. The temperature and time of activation can vary over wide ranges, generally longer times being required at lower temperatures and shorter times at higher temperatures. The effect of the activation procedure will hereafter be more fully discussed. Generally, catalysts prepared by milling solid silica with a solid chromium oxide are activated at lower temperatures than are catalysts prepared by impregnation of the silica with the chromium compound. Catalyst compositions prepared by dry mixing are ordinarily activated at temperatures of at least about 350° F. and not substantially greater than about 1500° F. Catalyst compositions prepared by impregnation with an aqueous solution of the chromium compound are ordinarily activated at a temperature of at least about 450° F. and not substantially greater than 1500° F. Times of activation can range from a few minutes to 50 hours or more.

The chromium oxide catalyst can be prepared by impregnation of the particulate silica with, for example, a solution of chromium oxide or a compound convertible to chromium oxide by calcination, followed by drying and activation of the composite at a temperature in the range of 450 to 1500° F. for a period of 3 to 10 hours or more. The chromium compound employed in preparation of the catalyst compositions can be selected from materials consisting of chromium trioxide, chromic nitrate, chromic acetate, chromic chloride, chromic sulfate, ammonium chromate, ammonium dichromate or other suitable salts of chromium.

The quantity of chromium, as chromium oxide, in the catalyst compositions can range from 0.1 to 10 or more weight percent and is ordinarily a minor component of the catalyst in terms of weight percent. Chromium contents as high as 50 weight percent are operative for some monomers, but amounts above 10 weight percent do not appear to be advantageous for the polymerization of ethylene. However, for the polymerization of propylene and higher boiling mono 1-olefins, higher chromium contents are often advantageous.

The catalyst compositions of this invention can be employed in the polymerization of mono 1-olefins having a maximum of 8 carbon atoms to form homopolymers and copolymers of such mono 1-olefins. The polymerization can be effected with a fixed-bed catalyst or with a mobile catalyst. A preferred method of conducting the polymerization reaction comprises contacting the feed olefin with a slurry of the comminuted chromium oxide catalyst in suspension in the solvent or diluent. From about 0.01 to 10 weight percent of catalyst based on the weight of diluent is ordinarily employed. The catalyst can be maintained in suspension by mechanical agitation device and/or by virtue of the velocity of the incoming feed or diluent.

The temperature to be employed in conducting the polymerization reaction can vary over a wide range but normally ranges from about 100 to about 500° F., preferably 150 to 450° F. The polymerization pressure utilized is preferably high enough to maintain any diluent, when employed, in the liquid phase. Generally pressures of at least 100 to 300 p.s.i., depending on the feed and temperature, and a pressure of approximately 500 p.s.i. are preferred. Pressures as high as 700 p.s.i. or higher may be employed or pressures as low as atmospheric can be used when the reaction is conducted in the gaseous phase. Generally, conventional mono 1-olefin polymerization conditions known in the art such as described in U.S. 2,825,721 can be employed when utilizing the novel catalyst compositions of this invention.

The catalyst compositions of this invention are unusually sensitive to the employment of different activation temperatures. For example, in the polymerization of ethylene activation temperatures of 1100° F., 1300° F., and 1500° F. produce a range of melt indexes covering the entire span of conventional commercial solution form resins when employeding a single set of polymerization conditions. By comparison, when employing conventional silica gel catalyst compositions in solution polymerization conditions, both activation temperature and reaction conditions must be varied to produce the same variations in melt index.

The following examples are presented to illustrate objects and advantages of the invention. It is not intended, however, to limit the invention to the specific embodiments presented therein.

EXAMPLE 1

This example illustrates the preparation of the catalyst composition by the aqueous impregnation of a porous, precipitated silica. The porous, precipitated silica employed in this example and in the succeeding examples has an ultimate particle size (size of the catalyst particles in the polymerization reactor) of less than 0.0005 millimeter in diameter. The average pore radius of the porous, precipitated silica is about 75.8 Angstroms and 82.0 Angstroms (unreductionized). The term "unreductionized" refers to larger agglomerates of the silica particles. The pore volume of the porous, precipitated silica is about 0.50 cc. per gram and surface area of the silica is 314 square meters per gram and 263 square meters per gram (unreductionized).

A 50 gram sample of the reductionized porous, precipitated silica was wetted with a minimum amount of water to provide a sticky mass which was permitted to air-dry overnight. This mass was ground so as to pass through an 80 mesh screen and further dried at 60° C. under vacuum. The product was wetted with water to form a thixotropic slurry and 0.98 grams of $CrO_3$ in water was added with stirring. The slurry was stirred while heating on a sand bath to remove water. The product was further dried for 24 hours at 60° C. under vacuum and ground so as to pass through a 60 mesh screen.

EXAMPLE 2

This example illustrates the preparation of the catalyst composition by a dry impregnation procedure with the porous, precipitated silica employed in the preparation of the catalyst composition being an unreductionized silica. The unreductionized silica was slowly heated under vacuum in a round bottom flask on a rotating evaporator. The silica was maintained at a temperature of 210° C. for 3 hours. After cooling, 20.8 grams of the product was dry mixed with 0.41 gram of finely powdered (ball milled) $CrO_3$. The blend was returned to the apparatus and the heating cycle repeated so as to yield a light brown product ready for activation.

EXAMPLE 3

The catalyst composition of Example 1 was activated by heating in dry air to a temperature of 400° F. over a period of 85 minutes. The catalyst composition was held at this temperature for 35 minutes and then heated from 400° to 800° F. over a period of 65 minutes. The catalyst composition was maintained at this temperature for 60 minutes, heated to 1500° F. over a period of 180 minutes and held at a temperature of 1500° F. for a period of 75 minutes. The activated catalyst composition was then introduced into a one liter batch reactor as a slurry in n-hexane solvent and therein contacted with an ethylene feed in 500 ml. of n-hexane under polymerization temperature and pressure conditions. A polymerization temperature of 300° F. and a polymerization pressure of 450 p.s.i.g. were maintained during the polymerization run. 0.054 gram of the catalyst composition containing 2 weight percent chromium oxide was introduced into the batch reactor.

The batch polymerization reaction was conducted until a polymer product solution containing 34 weight percent solids was obtained. 170 grams of linear polyethylene having a melt index of 38.3 as determined by ASTM D–1238–57T was recovered from the reactor. The catalyst composition had a productivity of 3160 grams per gram of total catalyst composition and a polymerization rtte of 702 grams per gram of catalyst per hour of reaction.

EXAMPLE 4

The catalyst composition of Example 1 was activated by the procedure of Example 3 with the exception that a final activation temperature of 1300° F. was employed. The polymerization run of Example 3 was repeated with the further exception that 0.063 gram of the catalyst composition was introduced into the batch reactor.

The polymerization reaction was conducted until a polymer solids level of 37 weight percent was obtained in the reactor. 194 grams of linear polyethylene having a melt index of 7.9 as determined by the test method of Example 3 was recovered from the reactor. The catalyst productivity was 3081 grams per gram of total catalyst composition and the catalyst polymerization rate was 560 grams of polymer per gram of catalyst per hour.

EXAMPLE 5

The run of Example 4 was repeated with the exception that a catalyst activation temperature of 1100° F. was employed and 0.068 gram of catalyst was introduced into the reactor. The polymerization reaction was conducted until a reaction mixture containing 27.0 weight percent polymer solids was obtained. 122 grams of linear polyethylene was recovered from the reactor having a melt index of 3.02 as determined by the test procedure of Example 3. The catalyst productivity was 1800 grams per gram of total catalyst and the catalyst composition demonstrated a polymerization rate of 514 grams per gram of total catalyst per hour.

EXAMPLE 6

The unreductionized catalyst composition of Example 2 was activated by the activation procedure of Example 3 with the exception that the final activation temperature was 1300° F. The polymerization run of Example 3 was repeated with the further exception that 0.082 gram of catalyst was introduced into the batch reactor.

The polymerization reaction was conducted until a reaction mixture containing 37 weight percent polymer solids was obtained in the reactor. 194 grams of linear polyethylene having a melt index of 8.9 was recovered. The productivity of the catalyst composition was 2387 grams of polymer per gram of total catalyst composition and the polymerization rate of the catalyst composition was 530 grams of polymer per gram of catalyst composition per hour of reaction.

EXAMPLE 7

The narrow molecular weight distribution of the products of the polymerization runs of Examples 3–6 can be shown by determination of the shear response—the ratio of the test results obtained by the use of the Canadian Industries Limited High Shear Viscometer when operating at a gas pressure of 1400 p.s.i. and a temperature of 160° C., to the melt index of the polymer as determined by the test method of Example 3. The low CIL/MI values shown below in Table I demonstrate an unusually narrow molecular weight distribution for the products.

TABLE I

| Polymer product | Catalyst activation temperature, ° F. | Melt index | Shear response |
| --- | --- | --- | --- |
| Example: | | | |
| 3 | 1,500 | 38.3 | 1.17 |
| 4 | 1,300 | 7.9 | 1.18 |
| 5 | 1,100 | 3.02 | 1.72 |
| 6 | 1,300 | 8.9 | 1.09 |

Although the invention has been described with reference to specific materials, embodiments and details, various modifications and changes, within the scope of the invention, will be apparent to those skilled in the art and are contemplated to be embraced in the invention.

What is claimed is.

1. In a process for polymerizing ethylene to a normally solid polymer in the presence of a chromium-oxide catalyst supported on silica in a hydrocarbon solvent under conditions such that the ethylene polymer is soluble in the hydrocarbon solvent; the improvement which consists of employing as the catalyst, chromium oxide, at least a portion of the chromium being hexavalent, associated with a friable, amorphous, porous precipitated silica having a surface area of not less than 150 square meters per gram, said silica being further characterized in consisting of friable agglomerates of fine silica particles, such agglomerates having diameters in the range of 50 to 100 microns and being made up principally of individual silica particles having diameters of less than 0.0005 millimeter; such agglomerates having a significant number of pores having a diameter in excess of 300 angstroms.

2. The process of claim 1 wherein the average diameter of the catalyst particles in the polymer product is less than 0.0005 millimeter.

3. A catalyst useful for the polymerization of ethylene consisting essentially of an oxide of chromium, at least a portion of the chromium being hexavalent, supported on a friable, amorphous, porous precipitated silica having a surface area of not less than 150 square meters per gram, said silica being further characterized in consisting of friable agglomerates of fine silica particles, such agglomerates having diameters in the range of 50 to 100 microns and being made up principally of individual silica particles having diameters of less than 0.0005 millimeter, such agglomerates having a significant number of pores having a diameter in excess of 300 angstroms.

4. In a process for the preparation of a polymerization catalyst which comprises depositing an oxide of chromium on silica and activating the resulting composite by heating to a temperature in the range of 350 to 1500° F. in a dry oxygen-containing atmosphere to oxidize at least a portion of the chromium to the hexavalent state; the improvement which consists of depositing the oxide of chromium upon a friable, amorphous, porous precipitated silica having a surface area of not less than 150 square meters per gram, said silica being further characterized in consisting of friable agglomerates of fine silica particles, such agglomerates having diameters in the range of 50 to 100 microns and being made up principally of individual silica particles having diameters of less than 0.0005 millimeter; such agglomerates having a significant number of pores having a diameter in excess of 300 angstroms.

References Cited

UNITED STATES PATENTS

| | | | |
|---|---|---|---|
| 3,624,063 | 11/1971 | Witt | 260—94.9 D |
| 3,132,125 | 5/1964 | Schwander et al. | 260—94.9 D |
| 3,225,023 | 12/1965 | Hogan et al. | 260—94.9 D |
| 3,208,823 | 9/1965 | Baker et al. | 260—37 R |

FOREIGN PATENTS

| | | | |
|---|---|---|---|
| 858,674 | 1/1961 | Great Britain | 260—94.9 D |

OTHER REFERENCES

"Kirk-Othmer" Encyclopedia of Chemical Technology, vol. 18, pp. 61–72, Interscience, New York (1969).

JOSEPH L. SCHOFER, Primary Examiner

A. HOLLER, Assistant Examiner

U.S. Cl. X.R.

252—458; 260—88.2 B